Figure 1:
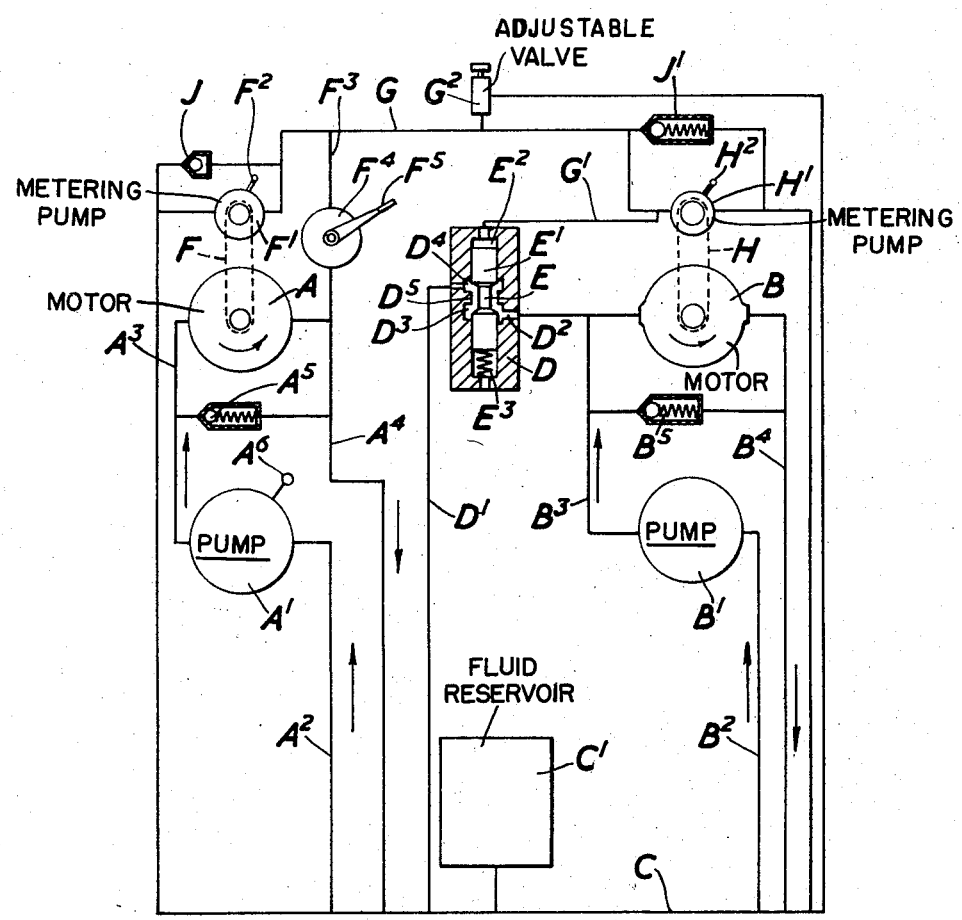

Aug. 12, 1958   F. B. LEVETUS ET AL   2,846,849
APPARATUS FOR MAINTAINING A PREDETERMINED RELATIONSHIP
BETWEEN THE SPEEDS OF TWO INDEPENDENTLY DRIVEN MEMBERS
Filed Nov. 28, 1955   2 Sheets-Sheet 1

INVENTORS
FRANCIS B. LEVETUS
GEORGE E. CHITTENDEN

BY Watson, Cole, Grindle & Watson   ATTORNEYS

United States Patent Office 2,846,849
Patented Aug. 12, 1958

2,846,849

APPARATUS FOR MAINTAINING A PREDETERMINED RELATIONSHIP BETWEEN THE SPEEDS OF TWO INDEPENDENTLY DRIVEN MEMBERS

Francis Benjamin Levetus and George Edward Chittenden, Allesley, Coventry, England, assignors to The Keelavite Company Limited, Coventry, England, a British company Application November 28, 1955, Serial No. 549,497

3 Claims. (Cl. 60—53)

This invention relates to apparatus for maintaining a predetermined relationship between the speeds of at least two independently driven members one of which at least is driven by a hydraulic motor of the displacement type, and of the kind comprising displacement pumps of the metering type (hereinafter called metering pumps) driven respectively from the two members, a communicating passage (hereinafter called the control pressure passage) leading from the delivery of one metering pump to the inlet of the other metering pump, a control valve arranged to control the volumetric rate of flow of working fluid through the hydraulic motor and hence the speed of this motor, and pressure-responsive apparatus including at least one pressure-responsive member arranged to be controlled by the pressure in the control pressure passage and so to control the control valve as to tend to maintain equal the volumetric rates of flow of fluid respectively to and from the control pressure passage through the metering pumps.

One form of such apparatus is described in the specification of British Patent No. 711,486.

In apparatus of the above kind the accurate maintenance of any desired relationship between the speeds of the two independently driven members may be adversely effected by changes in load or when the setting of the apparatus is altered to effect a change in the speed.

The present invention is applicable to apparatus of the kind referred to whether embodying the features of the form of apparatus described in the above specification or not.

In some cases in apparatus of the kind referred to it may be desirable to produce a predetermined shift of phase between the two independently driven members, for example to vary the tension or slack in a web extending between them and, for example, driven by one of them, and the present invention aims at providing means by which predetermined phase shifts can be effected and maintained for any desired time interval between the two independently driven members.

To this end apparatus of the kind referred to for maintaining a predetermined relationship between the speeds of two independently driven members includes means (hereinafter called phase control means) by which fluid can be forced into or withdrawn from the control pressure passage independently of the flow through the metering pumps so as to cause and maintain under desired conditions a predetermined phase shift between the two independently driven members.

Such phase control means may be arranged to be manually operated and/or automatically controlled by apparatus responsive to any desired signal, for example a signal received from mechanism influenced by or effecting control of one or more operating conditions of the apparatus.

The phase control means by which fluid can be forced into or withdrawn from the control pressure passage in apparatus according to the invention may be of any convenient type and in one example may be in the form of a piston or the equivalent arranged to be moved manually and/or automatically within a double ended cylinder, the chambers on the two sides of the piston communicating respectively with the control pressure passage and with a return flow passage by which the outlet of the metering pump at the outlet end of the control pressure passage is connected to the inlet of the metering pump at the inlet end of the control pressure passage.

Alternatively the phase control means for forcing fluid into or withdrawing it from the control pressure passage may itself be in the form of an additional metering pump, either of the variable or fixed capacity type, arranged to be operated manually and/or automatically.

Figure 2:
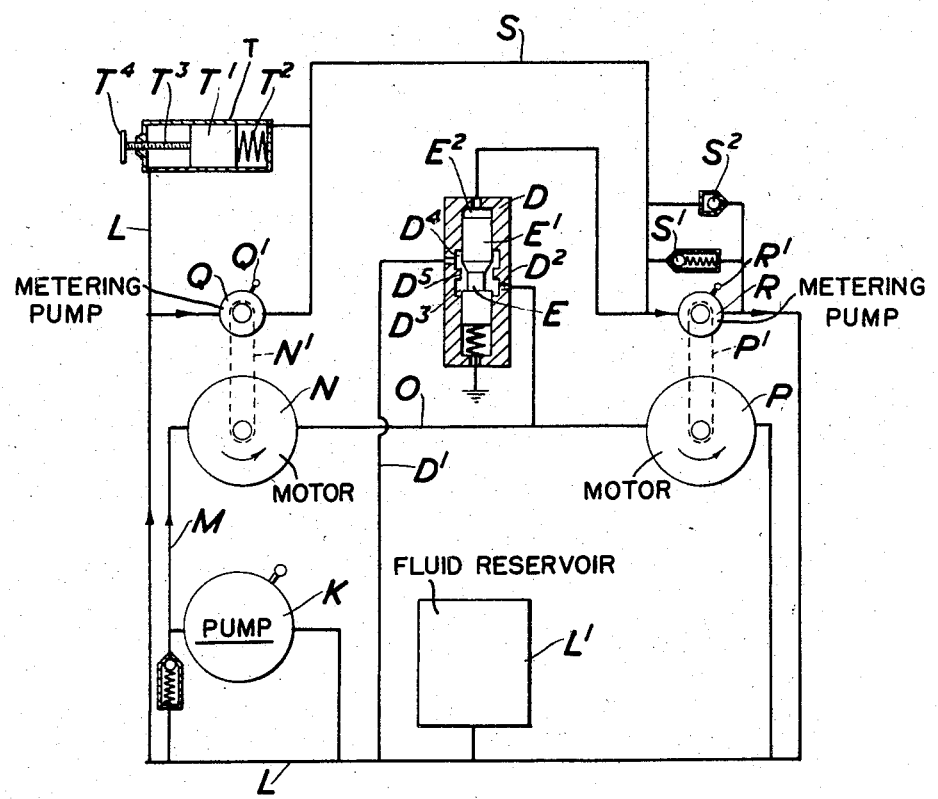

Two arrangements according to the invention are shown diagrammatically by way of example respectively in Figure 1 and in Figure 2 of the accompanying drawings.

In the arrangement shown in Figure 1 of the accompanying drawings the apparatus comprises two independently driven hydraulic motors A and B driven respectively by hydraulic fluid delivered thereto by independently driven hydraulic pumps $A^1$ and $B^1$. Thus the pump $A^1$ delivers hydraulic fluid from a suction passage $A^2$ through a delivery passage $A^3$ to the inlet of the hydraulic motor A, the suction passage $A^2$ being in free communication with a passage C which is in open communication with a fluid reservoir $C^1$. The outlet from the motor A communicates through a passage $A^4$ with the passage C while a spring pressed relief valve $A^5$ is provided between the passages $A^3$ and $A^4$ to act as a safety valve should the pressure in the passage $A^3$ exceed some predetermined safe value.

Similarly the pump $B^1$ draws hydraulic fluid from the passage C through a passage $B^2$ and delivers it through a passage $B^3$ to the inlet of the motor B the outlet of which is connected through a passage $B^4$ to the passage C.

In the example shown it is assumed that the pump $A^1$ is driven by a constant speed motor, the speed at which such motor is set to operate and/or the capacity of the pump being adjustable as by a control indicated at $A^6$, so that at any setting of the pump $A^1$ and its driving motor the hydraulic motor A will be driven at a constant predetermined speed.

The pump $B^1$ is assumed to be driven by a motor, which can also be a constant speed motor, and this pump has a rate of delivery such that under normal operating conditions the motor B will be driven at its required predetermined speed having the required relationship to the speed of the motor A when substantially less than the whole of the fluid delivered by the pump $B^1$ is passing through the motor B. A spring pressed safety valve $B^5$ is provided between the passages $B^3$ and $B^4$ to prevent the occurrence of dangerous pressures in the passage $B^3$.

The required relationship between the speeds of the motors A and B is maintained by operation of a control valve D through which a controlled flow of hydraulic fluid can take place from the passage $B^3$ to a passage $D^1$ leading into the passage C, this flow control valve assembly D comprising a body part D containing an inlet port $D^2$ communicating with the passage $B^3$ and leading into an inlet chamber $D^3$ within the body D. The inlet chamber $D^3$ communicates with an outlet chamber $D^4$ through a port $D^5$ the effective cross sectional area of which can be varied by means of a valve member E one end of which is formed as a piston $E^1$ subject to the pressure in a pressure chamber $E^2$ while its other end is acted upon by a spring $E^3$, the lower end of the piston $E^1$ constituting the part which acts to restrict or close the port $D^5$. The valve assembly D, E, $E^1$ thus constitutes a pressure responsive valve responsive to the chamber $E^2$, It will thus be seen that the speed of rotation of the motor B can be controlled by controlling the quantity of hydraulic liquid which is permitted by the valve E to escape from the passage $B^3$ and that the position of the valve E will be determined by the pressure in the pressure chamber $E^2$.

The motor A is arranged to drive positively, as by means of a chain indicated at F a displacement type metering pump indicated at $F^1$ arranged to draw liquid from the passage C and deliver it to a passage G (hereinafter called the communicating passage). The motor B is also arranged positively to drive, as by means of a chain indicated at H a displacement type metering pump $H^1$ similar to the pump $F^1$, and the communicating passage G leads from the outlet of the metering pump $F^1$ to the inlet of the metering pump $H^1$ the outlet of which is connected to the passage C. One or each of the metering pumps $F^1$ and $H^1$ may be of the type in which the capacity of the pump can be varied as by means of a control lever indicated at $F^2$ or $H^2$.

The communicating passage G is connected at a point adjacent to or within the inlet of the pump $H^1$ by a passage $G^1$ to the pressure chamber $E^2$ of the valve D. Moreover a non-return valve J and a pressure relief $J^1$ are conveniently provided between the inlet and outlet sides respectively of the pumps $F^1$ and $H^1$.

Arranged in a passage $F^3$ extending between the passages G and $A^4$ is a metering pump $F^4$ arranged to be manually operated by a lever $F^5$ so that fluid can be forced into or withdrawn from the passage G by operation of such lever.

In operation, and assuming that the lever $F^5$ is maintained stationary, the pump $A^1$ and/or the speed of the motor driving it are set so as to drive the motor A at a desired predetermined speed. The metering pumps $F^1$ and $H^1$ are also set so that their capacities have the predetermined relationship required in order that the pump $H^1$ shall pass the same quantity of liquid as the pump $F^1$ when the motor B has the desired speed relationship to the motor A. The capacity of the pump $B^1$ will as mentioned be such as to enable the motor B to be driven at the required speed in relation to the motor A with surplus liquid escaping through the valve D. Under operating conditions it will therefore be seen that the motor B will at all times be maintained at a speed having the required relationship to that of the motor A by the automatic operation of the valve D since any reduction in the speed of the motor B and hence of the pump $H^1$ below the appropriate speed will result in an immediate pressure rise in the chamber $E^2$ and hence a closing of the valve D to cause the speed of the motor B to increase while similarly, if the speed of the motor B rises above the desired speed, the pressure in the chamber $E^2$ will be reduced and the valve D will open to reduce the speed of the motor B. It will be appreciated that in practice the operation of the valve D will tend to be so rapid and sensitive as substantially to prevent departures from the desired speed relationship and that the two motors A and B will be arranged to drive appropriate driven members.

It will also be apparent that the speed relationship between the motors A and B can be set at any value within a predetermined range by suitable adjustments of the relative capacities of the pumps $F^1$ and $H^1$ while the sensitivity or otherwise of the control for any one of a range of speed relationships can be varied by varying the capacities of these two pumps in the same sense by the same degree.

If, during operation, it is desired to alter the phase relationship between the motors A and B, this can be effected by rotating the lever $F^5$ through an appropriate angle so as to cause the metering pump $F^4$ to force an appropriate volume of liquid into or withdraw a volume of liquid from the passage G, which operation, it will be seen, will cause appropriate movement of the valve E to increase or reduce the speed of the motor B in relation to that of the motor A until a corresponding quantity of liquid to that forced into or withdrawn from the passage G been respectively withdrawn from or caused to enter the passage G by the corresponding relative change of phase between the metering pumps $F^2$ and $H^2$.

In a modification of the system shown in Figure 1 an adjustable liquid escape orifice $G^2$ may be provided in the communicating passage G as an additional or alternative means of enabling the speed relationship which is to be maintained between the two motors A and B to be varied.

In the alternative arrangement according to the invention shown in Figure 2 the system comprises a hydraulic pump K arranged to be driven by a constant speed motor, the capacity of the pump and/or the set speed of the motor being adjustable. The pump K delivers hydraulic fluid from a suction passage L communicating with a reservoir $L^1$ to a delivery passage M leading to the inlet of a hydraulic motor N. The outlet of the motor N communicates through a passage O with the inlet of a second hydraulic motor P the outlet of which communicates with the passage L, the motors N and P being arranged to drive appropriate driven members.

The capacity of the hydraulic motor N is greater than that of the hydraulic motor P so that if the whole of the hydraulic fluid from the motor N flows through the motor P the motor P will rotate at a higher speed than the motor N, and a control valve D similar to the control valve D in the system shown in Figure 1 controls the escape of hydraulic fluid from the passage O in a manner tending to maintain a predetermined speed relationship between the motors N and P. In the system shown in Figure 2 it will be seen that the inlet port $D^2$ of the valve D is connected to the passage O while the outlet chamber $D^4$ is connected by a passage $D^1$ to the passage L.

Driven respectively from the motors N and P as by chains $N^1$ and $P^1$ are displacement type metering pumps Q and R, the metering pump Q drawing liquid from the passage L and delivering it to a communicating passage S leading to the inlet of the metering pump R, the outlet of which leads to the passage L.

As indicated, the capacity of each of the metering pumps Q and R can be set at various values as by means of levers indicated at $Q^1$, $R^1$ and the passage S is connected to the pressure chamber $E^2$ of the valve D.

Further a safety valve $S^1$ is provided in parallel with the metering pump R to ensure against the occurrence of a dangerous pressure rise in the passage S and a non-return valve $S^2$ is also provided in parallel with the metering pump R to ensure against the occurrence in the passage S of a depression by which air might be drawn into the system.

Interposed between the passages S and L is a phase-control device comprising a cylinder T one end of which is connected to the passage S while its other end is connected to the passage L. Arranged within the cylinder T is a piston $T^1$ maintained by a spring $T^2$ in engagement with a screwthreaded adjusting device $T^3$ having an operating knob $T^4$.

It will thus be seen that, by adjustment of the device $T^3$, the piston $T^1$ can be caused to force fluid into or withdraw it from the passage S, a corresponding change of the phase relationship between the motor N and P being thus caused in the same way as operation of the lever $F^5$ causes phase change between the motors A and B in the construction shown in Figure 1.

It will be understood that, although the lever $F^5$ or device $T^3$ has been referred to above as hand-operated, either of these devices may be operated automatically in some predetermined manner without departing from the invention. Moreover, in the arrangement shown in Figure 1 the pump $F^4$ may be of the variable capacity type so that, by varying its capacity, the relationship between any predetermined movement of the lever F⁵ and the change in phase relationship between the motors A and B thus caused can be varied.

What we claim as our invention and desire to secure by Letters Patent is:

1. Apparatus for maintaining a predetermined relationship between the speeds of two independently driven members, at least one of which is driven by a hydraulic motor of the displacement type, including, in combination, displacement pumps of the metering type connected to be driven respectively from the two members, a pressure chamber, valve apparatus connected to control the volumetric rate of flow of fluid through the hydraulic motor and hence the speed of this motor, said valve apparatus being operable in response to variation in pressure in said pressure chamber, speed control means including a control pressure space comprising a passage interconnecting the delivery of one of the metering pumps and the inlet of the other metering pump, and the pressure chamber of the valve apparatus, whereby the speed control means tends to maintain approximately constant the volumetric rates of flow of fluid respectively to and from the control pressure space through the metering pumps, and phase control means comprising a normally stationary reversible fluid displacement apparatus connected to the control pressure space.

2. Apparatus as claimed in claim 1, in which the means for delivering fluid to and withdrawing it from the control pressure passage comprises a piston or the equivalent the chambers of two sides of which communicate respectively with the control pressure passage, and a return flow passage by which the two metering pumps are connected.

3. Apparatus as claimed in claim 1, in which the means for delivering fluid into or withdrawing it from the control pressure passage comprises a metering pump of variable or fixed capacity arranged to be operated manually or by control mechanism influenced by one or more operating conditions of the apparatus.

References Cited in the file of this patent

UNITED STATES PATENTS

| | | |
|---|---|---|
| 2,244,156 | Hixson et al. | June 3, 1941 |
| 2,389,830 | Tyler | Nov. 27, 1945 |
| 2,536,558 | Levetus et al. | Jan. 2, 1951 |
| 2,583,307 | Schneider | Jan. 22, 1952 |